(12) United States Patent
Seymour

(10) Patent No.: US 8,884,817 B2
(45) Date of Patent: Nov. 11, 2014

(54) GPS WITH AIDING FROM AD-HOC PEER-TO-PEER BLUETOOTH NETWORKS

(75) Inventor: Leslie Seymour, San Jose, CA (US)

(73) Assignee: CSR Technology Holdings Inc., San Jose, CA (US)

( * ) Notice: Subject to any disclaimer, the term of this patent is extended or adjusted under 35 U.S.C. 154(b) by 676 days.

(21) Appl. No.: 12/650,941

(22) Filed: Dec. 31, 2009

(65) Prior Publication Data

US 2011/0163914 A1    Jul. 7, 2011

(51) Int. Cl.
*G01S 19/25* (2010.01)
*G01S 19/05* (2010.01)
*G01S 5/00* (2006.01)

(52) U.S. Cl.
CPC ............. *G01S 19/258* (2013.01); *G01S 5/0072* (2013.01); *G01S 19/05* (2013.01)
USPC ................................. 342/357.64; 342/357.42

(58) Field of Classification Search
CPC ................................ G01S 19/258; G01S 19/05
USPC ..................... 340/539.13; 342/357.42, 357.64
See application file for complete search history.

(56) References Cited

U.S. PATENT DOCUMENTS

| | | | |
|---|---|---|---|
| 6,266,533 B1 * | 7/2001 | Zadeh et al. | 455/456.2 |
| 6,313,787 B1 * | 11/2001 | King et al. | 342/357.42 |
| 6,373,431 B1 * | 4/2002 | Nakajima | 342/357.66 |
| 6,603,406 B2 | 8/2003 | Jambhekar et al. | |
| 6,721,572 B1 | 4/2004 | Smith et al. | |
| 6,973,318 B2 | 12/2005 | Jambhekar et al. | |
| 7,149,534 B2 * | 12/2006 | Bloebaum et al. | 455/456.6 |
| 7,277,049 B2 * | 10/2007 | Korneluk et al. | 342/357.42 |
| 7,348,921 B2 * | 3/2008 | Yu | 342/357.63 |
| 7,583,769 B2 * | 9/2009 | Twitchell et al. | 375/349 |
| 2002/0142783 A1 * | 10/2002 | Yoldi et al. | 455/456 |
| 2002/0168985 A1 * | 11/2002 | Zhao et al. | 455/456 |
| 2003/0179134 A1 | 9/2003 | Lampert et al. | |
| 2005/0020282 A1 | 1/2005 | Pande et al. | |
| 2007/0159388 A1 * | 7/2007 | Allison et al. | 342/357.09 |
| 2007/0225016 A1 * | 9/2007 | Jendbro et al. | 455/456.1 |
| 2007/0247361 A1 * | 10/2007 | Shoarinejad | 342/357.09 |
| 2008/0258965 A1 | 10/2008 | Azim | |
| 2008/0262728 A1 | 10/2008 | Lokshin et al. | |
| 2008/0268830 A1 | 10/2008 | Sharma et al. | |

(Continued)

FOREIGN PATENT DOCUMENTS

| | | |
|---|---|---|
| EP | 0425763 | 5/1991 |
| EP | 0431956 | 6/1991 |

(Continued)

OTHER PUBLICATIONS

Search Report issued Apr. 21, 2011 in corresponding UK matter.

(Continued)

*Primary Examiner* — Gregory C Issing

(74) *Attorney, Agent, or Firm* — Pillsbury Winthrop Shaw Pittman LLP

(57) ABSTRACT

The present invention is related to location positioning systems, and more particularly, to a method and apparatus for providing an update of ephemeris information. According to one aspect, GPS enabled devices in the signal unavailable area monitors the state of its ephemeris data and time information. When the ephemeris data and time information become out of date, the GPS enable device uses an ad hoc Bluetooth network to retrieve ephemeris data and time information from another GPS enabled device with more current data. According to further aspects, a map of a deep hole region in which GPS and other cellular signals are not available, is generated to enable power reduction and cost saving measures.

13 Claims, 6 Drawing Sheets

(56) References Cited

U.S. PATENT DOCUMENTS

| | | | |
|---|---|---|---|
| 2009/0079622 A1* | 3/2009 | Seshadri et al. | 342/357.1 |
| 2009/0115657 A1* | 5/2009 | Cheng et al. | 342/357.06 |
| 2010/0007553 A1* | 1/2010 | Kim et al. | 342/357.09 |

FOREIGN PATENT DOCUMENTS

| | | |
|---|---|---|
| JP | 2001-004735 | 1/2001 |
| WO | WO 00/28756 | 5/2000 |
| WO | WO 2008/083985 | 7/2008 |
| WO | 2009/080064 | 7/2009 |

OTHER PUBLICATIONS

Search Report issued Aug. 26, 2011 in corresponding UK matter.
Search Report issued Aug. 30, 2011 in corresponding UK matter.

* cited by examiner

120A $T_{age} = 30$ min

120B $T_{age} = 2$ hrs

120C $T_{age} = 5$ min

GPS WITH AIDING FROM AD-HOC PEER-TO-PEER BLUETOOTH NETWORKS

FIELD OF THE INVENTION

The present invention is related to location positioning systems, and more particularly, to a method for providing updated navigational data via a short range wireless network.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien NewYork, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver typically has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

The signals from the navigational satellites are modulated with navigational data at 50 bits/second (i.e., 1 bit/20 msec). This navigational data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contain telemetry bits and are not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames. The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4.

The almanac and ephemeris are used in the computation of the position of the satellites at a given time. The almanacs are valid for a longer period of six days but provide a less accurate satellite position and Doppler compared to ephemeris. Therefore, almanacs are not used when a fast position fix is required. On the other hand, the accuracy of the computed receiver position depends upon the accuracy of the satellite positions which in-turn depends upon the age of the ephemeris. The use of current ephemeris results in better and faster position estimation than one based on non-current or obsolete ephemeris. Therefore, it is necessary to use current ephemeris to get a fast receiver position fix.

A GPS receiver may acquire the signals and estimate the position depending upon the already available information. In the 'hot start' mode the receiver has current ephemeris and the position and time are known. In another mode known as 'warm start' the receiver has non-current ephemeris but the initial position and time are known as accurately as in the case of previous 'hot start'. In the third mode, known as 'cold start', the receiver has no knowledge of position, time or ephemeris. As expected the 'hot start' mode results in low Time-To-First-Fix (TTFF) while the 'warm start' mode which has non-current ephemeris may use that ephemeris or the almanac resulting in longer TTFF due to the less accurate Doppler estimation and ephemeris downloading. The 'cold start' takes still more time for the first position fix as there is no data available to aid signal acquisition and position fix.

Therefore, it is necessary to keep the ephemeris in the receiver current for a fast TTFF. Current ephemeris also helps when the received signal is weak and the ephemeris can not be downloaded. Some issued patents teach receiving the ephemeris through an aiding network or remote server instead of from an orbiting satellite. However, this approach results in higher cost and requires additional infrastructure. Another approach to keeping ephemeris current, without using a remote server, is to automatically download it from satellites in the background, such as described in U.S. Pat. No. 7,435, 357.

Some commercially available products such as SiRF InstantFixII from SiRF Technologies of San Jose, Calif. use extended ephemeris to improve start-up times without requiring network connectivity. With one observation of each satellite, SiRFInstantFixII accurately predicts satellite positions for up to three days—removing the need to download satellite ephemeris data at subsequent start-ups—resulting in full navigation in as little as five seconds, and with routine 7 meter accuracy. Moreover, such extended ephemeris products not only start tracking satellites and navigating more quickly, they can do it using signals much weaker than those needed to obtain satellite location data the traditional way, removing the barrier that often blocks successful navigation under tough GPS signal conditions.

When a GPS signal is not available and a cellular signal is available, others have used the cellular signal to update the ephemeris data and time information. However, this method leads to additional cellular over the air charges.

Nevertheless, some challenges remain. For example, when the receiver is in a location in which satellite signal is not available such as large office buildings, subways, indoor malls, expo halls, etc., the GPS receiver's stored ephemeris data and time may become out-of-date. Without any GPS signal, cellular signal or other supplementary external data source, the tracker cannot determine when to start looking for SV or cellular signal. Under these circumstances the battery for the GPS receiver can quickly be run down by repeated unsuccessful attempts to update the ephemeris and time data.

SUMMARY OF THE INVENTION

The present invention is related to location positioning systems, and more particularly, to a method for updating ephemeris information of a GPS enabled mobile device in an area in which GPS signal is unavailable. According to one aspect, GPS enabled devices in the signal unavailable area monitors the state of its ephemeris data and time information. When the ephemeris data and time information become out of date, the GPS enable device (starving device) uses an ad hoc Bluetooth network to retrieve ephemeris data and time information from another GPS enabled device (donor device) with more current data.

According to another aspect, the GPS enabled mobile device monitors the signal strength for GNSS, cellular and Wi-Fi. When the respective signal levels drop below a threshold value, a last known position is identified. When the signal strength is again above the threshold value the first fix is identified. The last known position and first fix location are uploaded to a server along with the respective timestamps. This information is then used to generate a signal unavailability or "deep hole" map. The deep hole map may be used to evaluate the feasibility of peer to peer (P2P) ad-hoc networks setup.

According to yet another aspect, the invention utilizes the deep hole map data such that when a device is nearing a deep hole area, the GPS enabled mobile device initiates an update of its ephemeris data to reduce the likelihood of the ephemeris data becoming out of date.

In furtherance of the above and other aspects, a method for updating ephemeris information according to embodiments of the invention includes establishing a short range wireless connection with at least one other mobile GPS enabled device; and receiving updated navigational data from the at least one other mobile GPS enabled device.

In additional furtherance of the above and other aspects, a method for generating a deep hole map according to embodiments of the invention includes detecting the signal strength of the mobile GPS enabled device; comparing the detected signal strength to a signal strength threshold; determining a last known position location when the signal strength falls below the signal strength threshold; determining a first fix position when the signal strength returns to above the signal strength threshold; transmitting the last known position data and the first fix position data to a crowded source server; and utilizing the last know position data and the first fix position data to produce the deep hole map.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
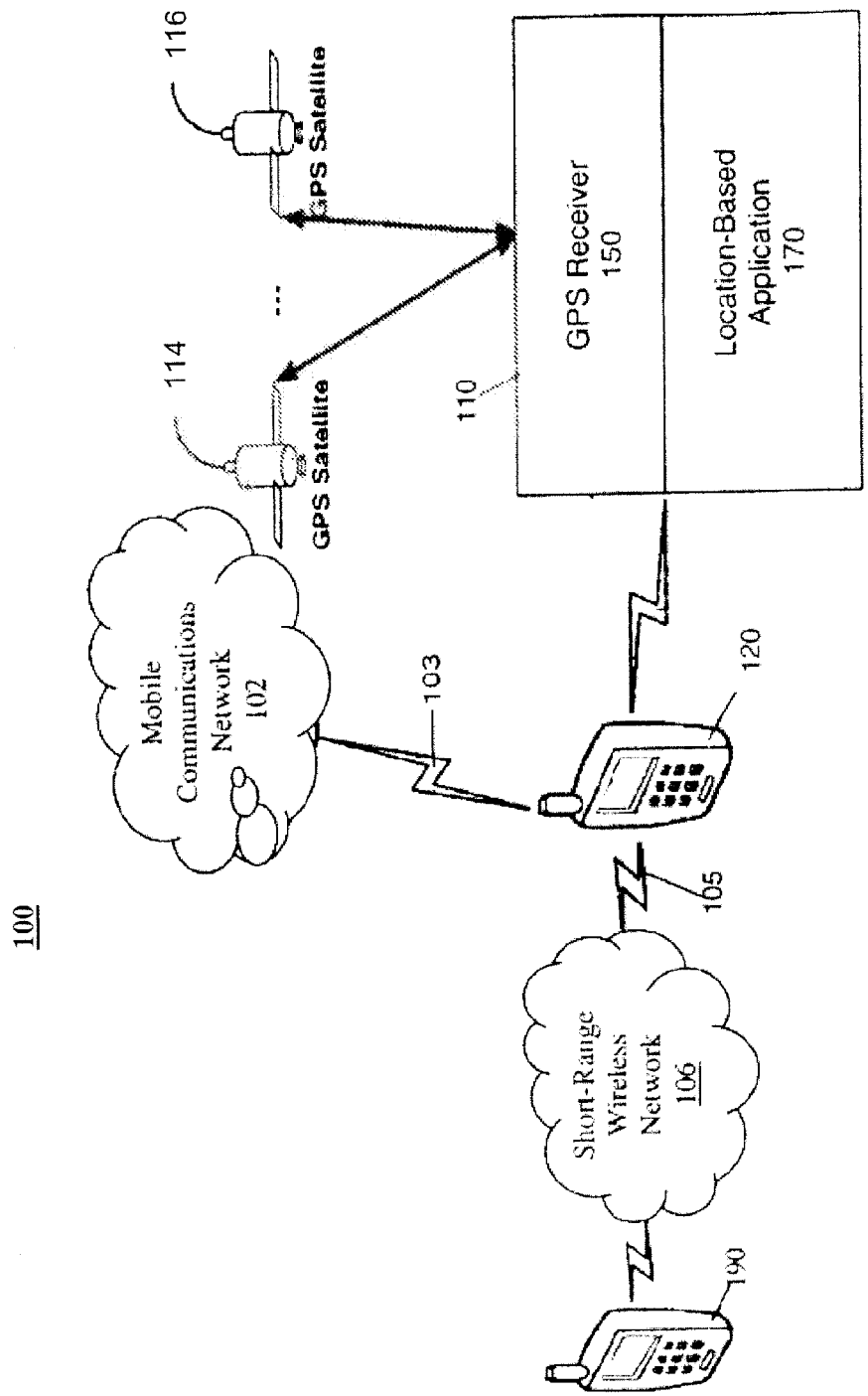
FIG. 1 is a block diagram of an example implementation of principles of the invention.

FIG. 1 is a block diagram of an example system 100 for providing updated navigational data to a mobile GPS enabled device 120. The system 100 includes a mobile communications network 102 and a GPS system 104. The mobile communications network 102 provides telecommunications services to a mobile GPS enabled device 120. The GPS system 104 includes a plurality of satellites 114, 116, which provide positioning data to the GPS receiver 150 of the mobile GPS enabled device 120. The GPS receiver 150 in the system 100 in FIG. 1 may be implemented in a location-based system 110, which is a GPS-enabled device that includes a location-based application 170.

The mobile communications network 102 may be any telecommunications network that provides any type of wireless service. A cellular telecommunications network is one example of such a network. More specific examples of such networks include mobile telecommunications networks based on GSM, CDMA, TDMA, and other signaling protocols.

The mobile communications network 102 communicates with the mobile GPS enabled device 120 using the network's signaling protocol over a communication link 103. The mobile GPS enabled device 120 includes navigational data such as ephemeris and almanac data and time information that is periodically updated. In one example, the mobile GPS enabled device 120 may include its own resident GPS receiver and a system for aiding the GPS receiver by providing updated time and position information.

The mobile GPS enabled device 120 may also communicate over a second network, such as a short-range wireless network 106 over a wireless communication link 105. For purposes of this specification, a short-range wireless network 106 may include any wireless network (even a node-to-node, or peer-to-peer connection) and specifically includes personal area networks, such as those based on the Bluetooth™ standard. The short-range wireless network 106 may also include wireless connections based on other wireless technologies, such as infra-red. The short-range wireless network 106 includes a synchronized clock system that enables each node connected to the short-range wireless network 106 to include a network clock that is synchronized with every other node in the short-range wireless network 106. In one example, the short-range wireless network 106 is a Bluetooth™ Piconet™ where the mobile GPS enabled device 120 is the Master Bluetooth™ node and the location-based device 110 is the Slave Bluetooth™ node. Embodiments described herein are described in the context of using the Bluetooth™ standard whether employed in a Bluetooth™ Piconet™ or in a peer-to-peer Bluetooth™ connection. Those of ordinary skill in the art will appreciate that Bluetooth™ is referred to herein as an example, and is not intended to limit the scope of the invention in any way.

Those of ordinary skill in the art will also appreciate that the mobile communications network 102 is not to be limited to cellular communications networks. Any network that may provide any type of service to a mobile handset may be used in alternative examples. The mobile GPS enabled device 120 in the example shown in FIG. 1 is a mobile telecommunications handset such as a cellular telephone. However, in other examples, the mobile GPS enabled device 120 may be a device for performing a wide variety of applications over a wireless network (such as the mobile communications network 102. For example, the mobile GPS enabled device 120 can be a personal navigation device (PND, e.g. from Garmin, TomTom, etc.), a cell or other type of telephone with built-in GPS functionality, or any GPS device embedded in tracking applications (e.g. automotive tracking from Trimble, package or fleet management tracking from FedEx, child locator tracking applications etc), or a personal digital assistant ("PDA") having a wireless network interface (e.g. as just one example, Wi-Fi capability) in addition to a short-range wireless network interface.

The location-based system 110 in the example in FIG. 1 may be any system that uses GPS services to perform a location-based application 170. The location-based service 110 in FIG. 1 includes a GPS receiver 150 and a short-range wireless network interface 160. The GPS receiver 150 obtains positioning data to perform GPS positioning functions via links to several GPS satellites 114, 116. The location-based application 110 may include navigation applications such as navigation systems in automobiles, handheld navigation devices, a PDA with navigation or map functions, or any other application that may operate in a device that uses GPS services.

Further, GPS Receiver 150 may be implemented using software and/or hardware, including GPS chipsets such as SiRFstarIII GSD3tw or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the frame synchronization techniques of the present invention after being taught by the present specification.

Figure 2:
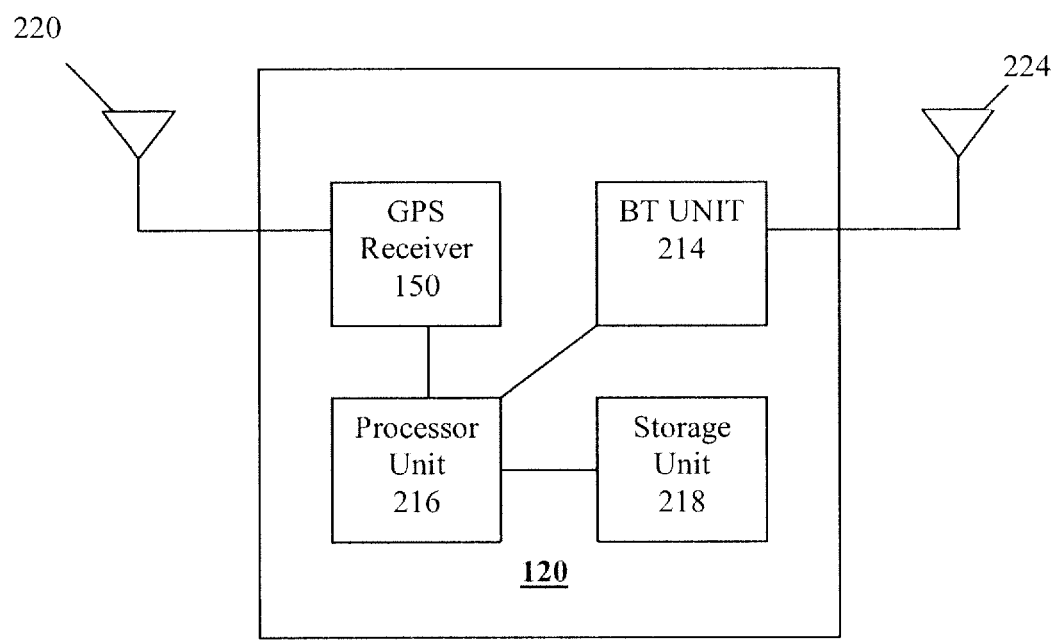
FIG. 2 is a block diagram illustrating a mobile GPS device according to an embodiment of the present invention.

FIG. 2 is a block diagram illustrating a mobile GPS device according to an embodiment of the present invention. As shown in FIG. 2, a mobile GPS device 120 may include a GPS receiver 150, a Bluetooth unit 214, a processor unit 216, and a storage unit 218. The GPS receiver 150 is configured to receive navigational data via a satellite signal and to perform positioning functions. The navigational data which may include for example, ephemeris, almanac, and time information, is stored in storage unit 218 along a timer $t_{age}$. Once the data is stored in the storage unit, timer $t_{ape}$ is reset to zero and a count initiated via processor unit 216 and used to monitor the time since the previous update of the navigational data.

When the timer $t_{age}$ reaches a predetermined count, the navigational data may be deemed stale or out-of-date. For example the predetermined count may be set to correspond to the time at which a cold start would be required in order to the determine the location of the mobile GPS device 200.

The Bluetooth unit 214 may be used to connect to another GPS device to retrieve updated navigational data. In other words, the updated navigational data for mobile GPS device 120 (starving device) may be obtained by receiving the navigational data (donor device) for the other GPS device via ad hoc Bluetooth Peer-to-Peer transfer. Given the close proximity of mobile GPS device 120 to the other GPS device in the no-coverage zone, the navigational data of the other GPS device serves as a good basis for determining the location for mobile GPS device 120. In other words, the accuracy of the transferred assistance data (i.e., navigational data) will be as good as the size of the no coverage zone. Thus, the navigational data of the other GPS device may be used to quickly determine a first fix position of mobile GPS device 120 upon regaining reception of the GPS signal.

Figure 3:
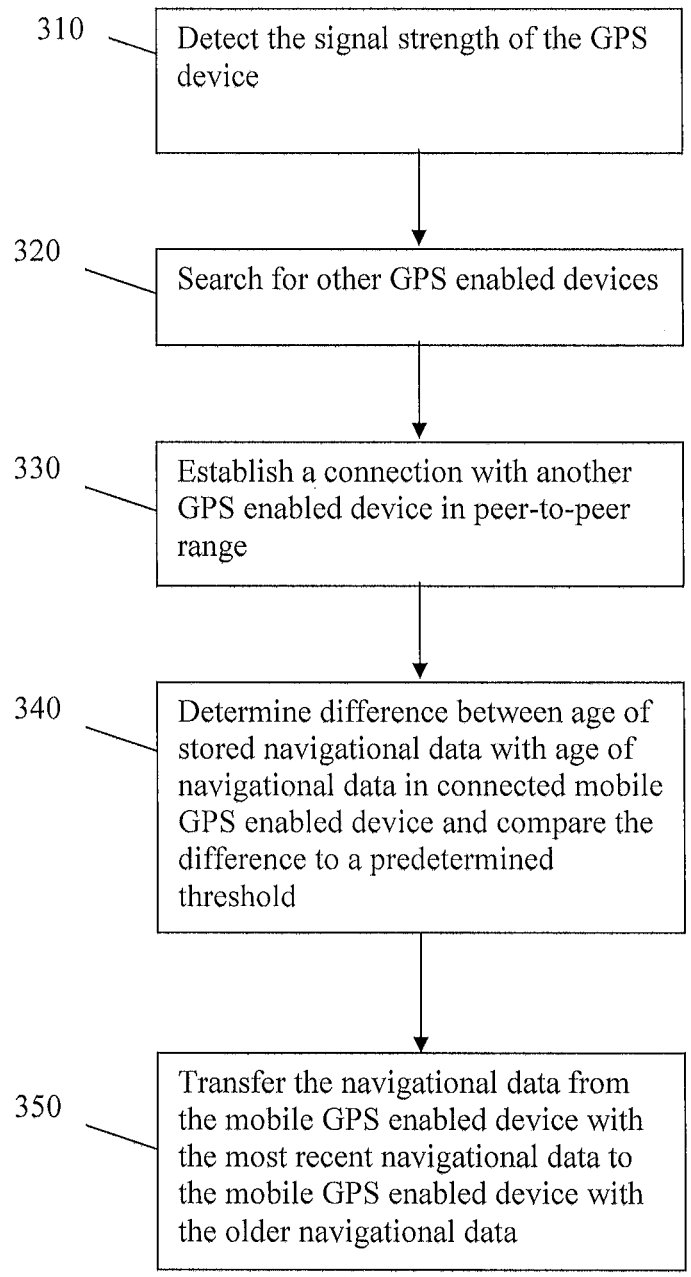
FIG. 3 is a flow diagram which illustrates a method for updating navigational data according to an embodiment of the present invention.

FIG. 3 is a flow diagram which illustrates a method for updating navigational data according to an embodiment of the present invention. By way of example, in FIG. 3, the ephemeris and time data are updated. Of course, those of ordinary skill in the art would appreciate that all or any subset of the navigational data could alternatively be updated. At step 310, the signal strength of a mobile GPS device 120 is detected. The monitored signal strength may be any available device communication signal, such as GNSS, cellular, and Wi-Fi, for example. If the signal strength is below a predetermined threshold (e.g., weak signal or no signal), then at step 320 a search is conducted to determine if there is another GPS enabled device in peer-to-peer transfer range. For example, the range for communication between two devices via Bluetooth is approximately 0-300 feet. When another GPS enabled device is located, a connection is established at step 330. At step 340, a comparison of the age of ephemeris data is made. If the difference in the age of the ephemeris data is above a predetermined threshold, then at step 350, the GPS enabled device with the older ephemeris data, receives a transfer of the ephemeris data from the GPS enabled device with the more recent ephemeris data.

The predetermined threshold value in the difference of the age of the assistance data may be set based on several factors. First, it may be set depending on how the age in the two devices relate to the age value threshold, where the age of the ephemeris data would significantly degrade the time to first fix (TTFF), and the quality of the position (QoP) determination. For example, when such ephemeris age threshold value falls in between the ephemeris age values in the two devices, the ephemeris age difference value threshold may be the smallest, i.e., the sensitivity of the need for more up-to-date ephemeris data is the highest. A small improvement in the age of the ephemeris data of the out-of-date device would make a much more significant contribution to the improvement in the TTFF and QoP values than in the case where the ephemeris data age values in both devices are either significantly higher or significantly lower than the critical ephemeris data age threshold value. For example, if the last valid outdoor acquired assistance data is becoming out of date after prolonged, two hours long presence in a no-signal deep hole, twenty minute age difference around this two hours threshold is typically significant enough to initiate the transfer to refresh the assistance data in the starving data. But the same twenty minutes age difference is likely to be insufficient if the age of the assistance data is less than forty minutes in both devices or more than four hours in both devices. Of course, one of ordinary skill in the art would understand that other values could be used for the age difference threshold for reasons of design preference or to improve power conservation.

In addition, the predetermined threshold value in the difference of the age of the assistance data may also be set based on the cost of refreshing the data in the participating devices and the significance of that cost. Such cost factors are mostly related to the loss of power in either of the two devices. Other factors may include the loss of computational resources such as CPU cycles and memory capacity when other functions also need to be computed in the devices concurrently with the location assistance computations.

Furthermore, similar to refreshing the ephemeris data in the device with more aged data, the time synchronization assistance data can also be updated in such device. For this purpose, the devices may compare the age difference between both their ephemeris data and their time synchronization data.

Figure 4:
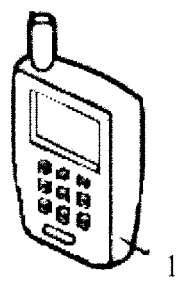
FIG. 4, illustrates a system utilizing a plurality of GPS devices according to an embodiment of the present invention.
Figure 4:
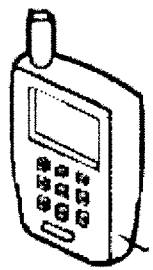
Figure 4:
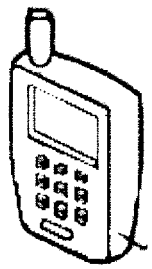

FIG. 4 illustrates a system utilizing a plurality of GPS devices according to an embodiment of the present invention. For ease of illustration, in FIG. 4 shows three GPS devices (120A, 120B, and 120C) all of which are configured as shown in FIG. 2. However, one of ordinary skill in the art would understand that any number of the GPS devices could also be used. As shown in FIG. 4, the age of the ephemeris data ($t_{age}$) for mobile GPS device 120B is greater than the age of ephemeris data for mobile GPS device 120A which is greater than the age of the ephemeris data ($t_{age}$) for mobile GPS device 120C. In operation, assuming GPS devices 120A, 120B, and 120C are all in a location in which satellite signal is not available, GPS devices 120A and 120B may each establish a connection with mobile GPS device 120C to retrieve more recent ephemeris and time data. For example, an ad hoc Bluetooth network connection may be established between the respective GPS devices. Of course, one of ordinary skill in the art would understand that dedicated short-range communications (DSRC) network or other peer-to-peer network configurations (e.g., Wi-Fi) could also be used. Once the transfer of navigational data is complete, the age of ephemeris data ($t_{age}$) for GPS devices 120A and 120B may then set match that of the ephemeris data for mobile GPS device 120C.

Figure 5:
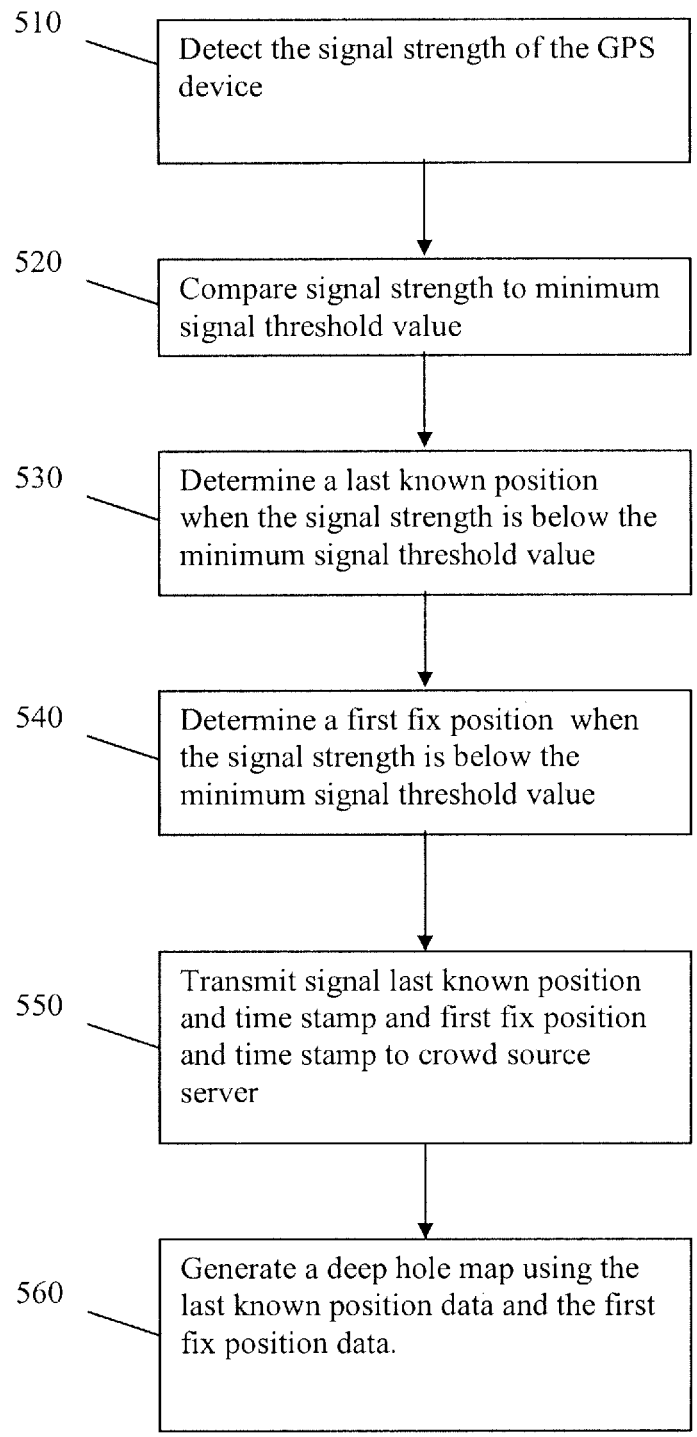
FIG. 5 illustrates a method for generating a map of deep holes according to an embodiment of the present invention.

In an embodiment of the present invention, a map may be generated based on signal strength of mobile GPS device 120. FIG. 5 illustrates a method for generating a map of deep holes, in which mobile GPS device 120 is unable to receive a satellite signal. Referring to FIG. 5, at step 510, the signal strength of mobile GPS device 120 is detected. At step 520, the signal strength of the GPS device is then compared to a predetermined threshold value. At step 530, when the signal strength of mobile GPS device 120 is below the predetermined threshold value, a last known position for the device is determined and stored in storage unit 207 along with a corresponding time stamp. At step 540, when the signal strength returns to a value above the predetermined threshold value, such that communication is restored, a first fix position for the device is determined and the stored in storage unit 207 along with a corresponding time stamp. At step 550, last known position data including the determined last known position and the corresponding time stamp and first fix position data including the determined first fix position and corresponding time stamp are transmitted to a crowd-sourcing server. At step 560 a deep hole map is generated using the last known position data and the first fix position data. Of course, additional data such as the ephemeris, almanac and other data used to determine the last known position and the first fix position may also be provided to the crowd sourcing server.

For greater definition and detail of the deep holes included on the deep hole map, a plurality of the GPS devices could be used.

In addition, the generated deep hole map may be updated in real-time. Furthermore, the generated deep hole map may be used to evaluate the feasibility of ad hoc peer-to-peer network setups.

Figure 6:
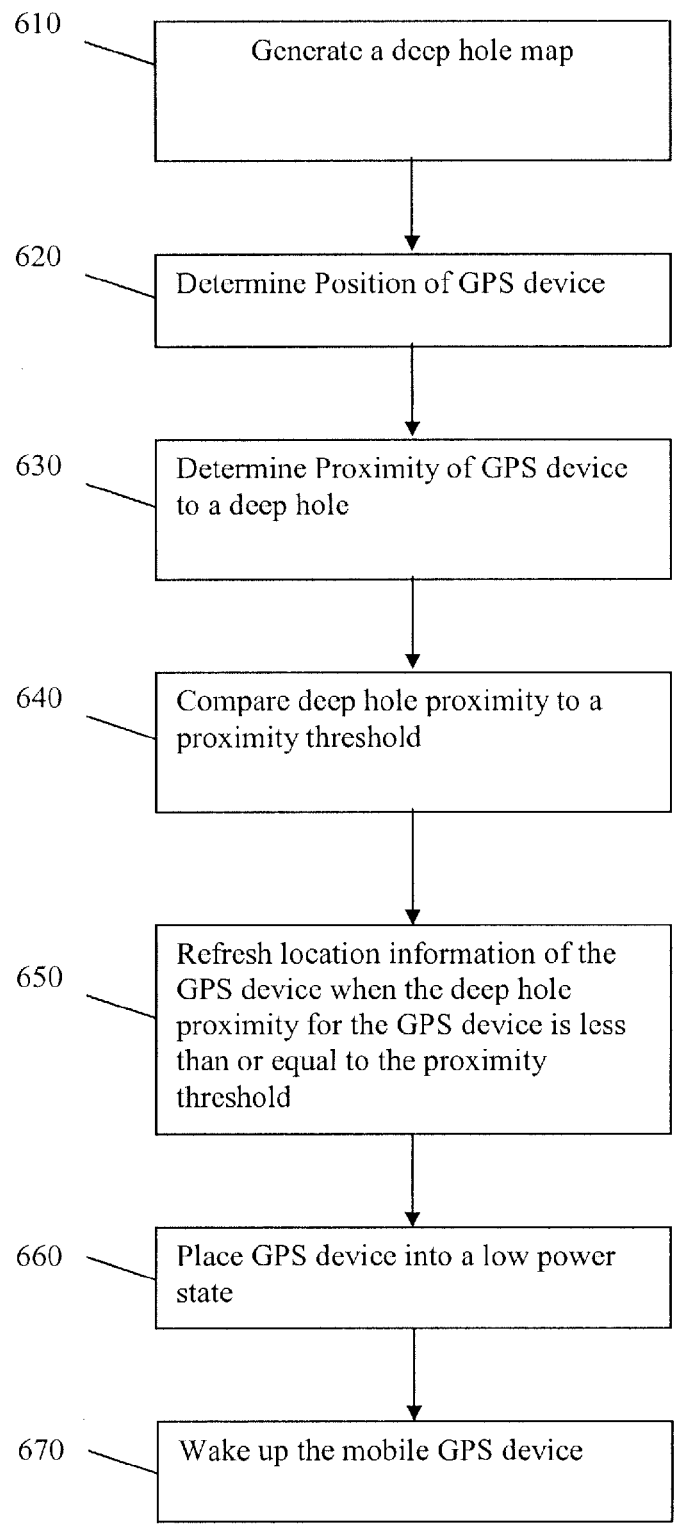
FIG. 6 is a flow diagram illustrating a method of refreshing navigational data according to an embodiment of the present invention.

FIG. 6 is a flow diagram illustrating a method of refreshing navigational data according to an embodiment of the present invention. Referring to FIG. 6, the method includes generating a deep hole map at step 610. At step 620, determining a position of the mobile GPS device 120 based on the navigational data in the GPS signal. At step 630, determining a proximity to a deep hole based on the determined position and the generated deep hole map. At step 640, comparing the determined deep hole proximity to a proximity threshold. The proximity threshold may be set according to a last known position used to generate the deep hole map, based on a location at a signal strength minimum or may otherwise be set according to design preference. For example, the proximity threshold may be set to one hundred meter when the device is moving 120 Km per second speed or 33 meters per second where measurements are taken at a rate of one measurement per second to provide three reasonable chances to receive the requires location data before entering the deep hole no signal area.

At step 650, when the mobile GPS device 120 is at a distance from the defined deep hole less than or equal to the proximity threshold, refreshing the navigational data via the GPS receiver. At step 660, placing the mobile GPS device 120 into a low power or sleep state. At step 670, waking up the mobile GPS device 120 at a predetermined time interval to check for an available satellite signal using an infrastructure signal scan. Alternatively, the mobile GPS device 120 could also be configured to wake up when a transfer of navigational data is requested by another GPS device, or when the navigational data for mobile GPS device 120 becomes stale.

Further, a deep hole device density could also be captured by crowd-sourcing either as real-time count or as a historical count by Time of Day (TOD) or Time of Year (TOY), etc. and may be used to determine the wake up time for mobile GPS device 120.

In addition, the method may include power optimization for the donor devices. For example, the donor devices may be configured with a power charge threshold with respect to is expenditure resulting from donating assistance data. For ease of illustration, one such example is as follows. Assume, we have X=600 of starving devices in the hole, and no qualified donor devices around them. Then a number of qualified devices start entering the hole, one at a time, with a d=15 min time period between the entrance of each subsequent device. For simplicity, assume all X starving devices are in DSRC connectivity range with the new donor device. The new device has good location assistance data, but the power charge level is so low, that it is sufficient only for P=10 minutes of DSRC connectivity maintenance, including the connectivity maintenance, S=1 second assistance data exchange with each connected device, the preceding connection set-up and the follow-up connectivity tear-down for all served connecting starving devices. As soon as this donor device enters the hole, connectivity requests from all X=600 starving devices are queued up in the entering donor device. This could result in a significant power drain for the donor device as serving all pending X=600 starving device would have depleted the power charge of the donor device, since 600*1 sec=10 minutes.

Using the donor device power optimization, the donor device may estimate the probable outcome of the depletion of its own power charge, knowing that its own power charge level is enough only for maximum 600 assistance data donation sessions and there were already 600 starving devices queued up for such assistance donation. In such a case, for example, the donor device may be configured with the power charge threshold being set such that no more that 2% or its power charge on donating assistance data, thus serving only 600*0.02=12 starving devices, then rejecting the rest of the queued up requests. Of course, one of ordinary skill in the art would understand that a different value for the power charge threshold could be chosen for reasons of design preference or to improve power optimization. For example, the power charge threshold could be set to a value corresponding to when the power charge of the device is sufficient for no more than thirty minutes of cell phone talk time.

All of the previously starving devices that have received the donated assistance data may then be utilized as donor devices. In this way, the complete process of refreshing the location assistance data for the entire starving device population would also be significantly shortened. Referring to the previous example, the entire process would last 3*12=36 seconds only, instead of 600 seconds by "directly recruiting" 12 additional donors—i.e., the first 12 served originally starving devices—and indirectly recruiting a couple of more devices in the third phase through the first generation of recruited donor devices.

Further improvement of the system may be realized by limiting the number of starving devices for which a connection is accepted (e.g., no more than 12) and refusing a connection for additional requesting devices, regardless of how many more could be additionally queuing up, by relying on the already queued up devices as subsequent donor devices. However, after the entering donor device has spent some significant time in the deep hole, it could potentially become a starving device. Such ambiguity could be mitigated by knowing a priori what the device density in the hole is and what the anticipated average navigation assistance data age distribution is in them. Such knowledge can be gained from the crowd-source server in the infrastructure, as described above. The higher the device density, the sooner the entering donor device can cut off accepting connectivity requests, relying on donor role delegation. At low anticipated device density, there is a reduced likelihood of creating a large enough number of donor delegates but the danger of its own power drain is also reduced. The optimal queue_size=f(anticipated_starving_device_density) function is thus approximately a bell-shaped function.

Similarly, the average duration of the devices in the deep hole may also be used to determine the threshold: the longer the duration values, the more likely they need refreshments thus increasing the burden on the donor power charge; but refreshing them would also be more likely to turn them into a qualified donor candidate for other, rejected starving devices.

Additional factors which may influence the selection of the refresh queue cut-off threshold may include the rate of other new donor devices entering the no-coverage area; and the speed with which the starving devices are moving away from their donor device and from the rest of the starving device population after the receipt of their assistance data.

In an embodiment, mobile GPS device 120 may be further configured to disable the infrastructure signal scan unless other GPS devices in their immediate proximity have recently received such infrastructure signal with acceptable RSS (Received Signal Strength). That is, when the mobile GPS device 120 enters a deep hole region where there are a plurality of other GPS devices with Bluetooth capability with no recent reception of infrastructure signal of acceptable RSS, the periodic infrastructure (i/s) signal scan is disabled such that the mobile GPS device 120 will not repeatedly attempt to search for a GPS or other cellular signal. In this case an ad-hoc connection is established with a plurality of the other GPS devices in peer-to-peer connectivity range in the deep hole to track time stamps of most recent i/s signal received from the infrastructure with acceptable RSS. Each of the GPS devices in the deep hole stores a timestamp (e.g., last_good_RSS_ time value) in its storage unit. When the GPS device receives an acceptable RSS of the i/s signal before entering the deep hole, its timestamp is updated. The mobile GPS device 120 compares the last good RSS timestamp value for the other GPS devices to its current real-time value. If the delta time between the real time and the timestamp is below a threshold value, then mobile GPS device 120 must be potentially close to the i/s coverage area. Thus, mobile GPS device 120 turns on the i/s signal scan since the likelihood of receiving a sufficient RSS signal has improved, but the i/s signal scan was turned off prior to that point. As a result, the power drain due to futile i/s signal scan attempts is effectively minimized.

Further improvement of the power drain optimization may be realized. For example, when mobile GPS device 120 is moving along an approximately straight line and encounters several other GPS devices in a row, mobile GPS device 120 may query the time stamp (e.g., last_good_RSS_time) values and determine that their delta time values are consistently decreasing. In this case, in anticipation of mobile GPS device 120 maintaining the same or similar direction, mobile GPS device 120 may reduce the delta time threshold to a lower value for turning on the i/s signal scan. Since mobile GPS device 120 is expecting to encounter a sufficient RSS signal (even with a lower delta-time threshold), it can avoid the expenditure of power on some unsuccessful scans with similar RSS detection results.

Further still, the number of devices within the deep hole (i.e., device density) may be used to further improve the power optimization. When device density in the deep hole is low, the power drain resulting from the search for GPS devices with Bluetooth or other dedicated short range communication (DRSC) capability may offset the savings via the optimized i/s signal scan. Thus a device density reasonability threshold is maintained, such that if the device density is less than this value, then the i/s signal scan power optimization will not be implemented.

The device density threshold may be set based on a number of factors including but not limited to, the power charge budget for the starving device, the actual power charge level of the starving device, the estimated speed and pattern of device movements, and the anticipated i/s timestamp value distribution within the deep hole.

The estimated actual device density value may be determined by dividing the estimated number or compatible devices in the deep hole by the areal size of the deep hole. The estimated actual device number can be determined by crowd sourcing as described above either by real-time counting and crowd sourcing the entering and leaving devices or by averaging historical count values by time of week (TOW), time of day (TOD), etc.

It will be understood, and is appreciated by persons skilled in the art, that one or more functions, modules, units, blocks, processes, sub-processes, or process steps described above may be performed by hardware and/or software. If the process is performed by software, the software may reside in software memory (not shown) in any of the devices described above. The software in software memory may include an ordered listing of executable instructions for implementing logical functions (i.e., "logic" that may be implemented either in digital form such as digital circuitry or source code or in analog form such as analog circuitry or an analog source such an analog electrical, sound or video signal), and may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, but nonetheless a non-exhaustive list, of computer-readable media would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for updating location data of a first mobile Satellite Positioning System (SPS) enabled device comprising:
   determining a need for updating stored location data for the first mobile SPS enabled device based on an age of the stored location data;
   establishing an ad-hoc short range wireless network with other mobile SPS enabled devices;
   receiving an age of more recent location data in at least one of the other mobile SPS enabled devices using a connection between the first mobile SPS enabled device and the at least one other mobile SPS enabled device in the ad-hoc short range wireless network;
   determining a difference between the age of the stored location data in the first mobile SPS enabled device with the age of more recent location data in the at least one of the other mobile SPS enabled devices;
   comparing the difference to a predetermined threshold value;
   further comparing both the age of the location data for the at least one other mobile SPS enabled device and the age of the stored location data for the first mobile SPS enabled device to a predetermined age threshold value; and
   after performing the comparing and further comparing steps, receiving the more recent location data from the at least one other mobile SPS enabled device to update the stored location data of the first mobile SPS enabled device by replacing it with the more recent location data only if the difference exceeds the predetermined threshold value and further depending on the results of the further comparison to the predetermined age threshold value.

2. The method according to claim 1, wherein the short range wireless network is an ad hoc Bluetooth network.

3. The method according to claim 1, wherein the location data includes ephemeris data.

4. The method according to claim 3, wherein the location data includes time sync data.

5. The method according to claim 1, wherein the ad-hoc short range wireless network is a peer-to-peer Wi-Fi network.

6. The method according to claim 1, wherein the method further comprises: initiating a low-power mode after updating the location data of the first mobile SPS enabled device.

7. The method according to claim 6, wherein the method further comprises: periodically terminating the low-power mode and waking the first mobile SPS enabled device up to verify the need for updating the stored location data.

8. The method according to claim 1, wherein once the first mobile SPS enabled device has an updated location data, the first mobile SPS enabled device is available to provide the updated location data to other mobile SPS enabled devices within the short-range wireless network.

9. The method according to claim 1, wherein the predetermined threshold value and the predetermined age threshold value are configured such that updating the more recent location data from the at least one other mobile SPS enabled device will likely contribute to improvement in time to first fix (TTFF) for the first mobile SPS enabled device.

10. The method according to claim 1, wherein the ad-hoc short range wireless network is a peer-to-peer Bluetooth network.

11. A first mobile Satellite Positioning System (SPS) enabled device configured to update stored location data, comprising:
   a storage unit;
   a timer for associating an age with location data stored in the storage unit; and
   a processor unit configured to perform a location data updating method including:
      determining a need for updating stored location data for the first mobile SPS enabled device based on an age of the stored location data associated with the stored location data by the timer;
      establishing an ad-hoc short range wireless network with other mobile SPS enabled devices;
      receiving an age of more recent location data in at least one of the other mobile SPS enabled devices using a connection between the first mobile SPS enabled device and the at least one other mobile SPS enabled device in the ad-hoc short range wireless network;
      determining a difference between the age of the stored location data in the first mobile SPS enabled device with the age of more recent location data in the at least one of the other mobile SPS enabled devices;
      comparing the difference to a predetermined threshold value;
      further comparing both the age of the location data for the at least one other mobile SPS enabled device and the age of the stored location data for the first mobile SPS enabled device to a predetermined age threshold value; and
      after performing the comparing and further comparing steps, receiving the more recent location data from the at least one other mobile SPS enabled device to update the stored location data of the first mobile SPS enabled device by replacing it with the more recent location data only if the difference exceeds the predetermined threshold value and further depending on the results of the further comparison to the predetermined age threshold value.

12. The device according to claim 11, wherein the predetermined threshold value and the predetermined age threshold value are configured such that updating the more recent location data from the at least one other mobile SPS enabled device will likely contribute to improvement in time to first fix (TTFF) for the first mobile SPS enabled device.

13. The device according to claim 11, wherein the ad-hoc short range wireless network is a peer-to-peer Bluetooth network.

* * * * *

UNITED STATES PATENT AND TRADEMARK OFFICE
CERTIFICATE OF CORRECTION

| | | |
|---|---|---|
| PATENT NO. | : 8,884,817 B2 | Page 1 of 1 |
| APPLICATION NO. | : 12/650941 | |
| DATED | : November 11, 2014 | |
| INVENTOR(S) | : Seymour | |

It is certified that error appears in the above-identified patent and that said Letters Patent is hereby corrected as shown below:

In the Specification,

In Column 6, Line 45, delete "$t_{ape}$" and insert -- $t_{age}$ --, therefor.

In Column 8, Line 20, delete "1208" and insert -- 120B --, therefor.

Signed and Sealed this
Fourteenth Day of April, 2015

Michelle K. Lee
*Director of the United States Patent and Trademark Office*